Jan. 26, 1965 J. ROSÁN 3,167,105
SELF-LOCKING NUT AND BOLT UNIT
Filed Dec. 15, 1959 3 Sheets-Sheet 1

INVENTOR,
Joseph Rosán
BY C. Lauren Maltby
ATTORNEY

Jan. 26, 1965  J. ROSÁN  3,167,105
SELF-LOCKING NUT AND BOLT UNIT
Filed Dec. 15, 1959  3 Sheets-Sheet 2

INVENTOR.
Joseph Rosán
BY
C. Lauren Maltby
ATTORNEY

Jan. 26, 1965        J. ROSÁN        3,167,105

SELF-LOCKING NUT AND BOLT UNIT

Filed Dec. 15, 1959        3 Sheets-Sheet 3

INVENTOR.
Joseph Rosán
BY C. Lauren Maltby
ATTORNEY

United States Patent Office 3,167,105
Patented Jan. 26, 1965

3,167,105
SELF-LOCKING NUT AND BOLT UNIT
Joseph Rosan, Newport Beach, Calif., assignor to Rosan Engineering Corporation, Newport Beach, Calif., a corporation of California
Filed Dec. 15, 1959, Ser. No. 859,604
9 Claims. (Cl. 151—11)

This invention relates to fastening devices, and more specifically to improvements in high torque self-locking nut and bolt units.

This application is a continuation-in-part of application Serial No. 524,156, filed July 25, 1955, and now abandoned.

The threaded screw and bolt art, and especially the lock nut art, is highly developed and has produced many types of and means for locking nuts to bolts and threaded screws. Many such means require auxiliary parts, such as cotter pins, clamps, wedge pins, shells or springs which, for manufacturing or economic reasons, are not practical or are so complicated as to require special tools for their use. In other types, the nut or screw must be of special construction which rules out its adaptability for general use. The foregoing and other shortcomings and disadvantages in prior art structures have been largely overcome in the development of the present invention covering a high torque, self-locking nut and bolt unit.

It is, therefore, the general purpose and objective of this invention to provide a novel and improved high torque, self-locking nut and bolt unit.

Another and more specific object of the invention is to provide a simple, practical and inexpensive self-locking nut and bolt unit of the character described.

A further object of the invention is to provide a novel nut and bolt unit wherein the parts require but slight modification over conventional forms.

An additional object of the invention is to provide an improved and novel self-locking nut and bolt unit which has high torque features and yet may be readily disassembled within practical torque limits.

Another object of the invention is to provide a novel high torque, self-locking nut and bolt unit not requiring any auxiliary parts such as pins, springs, clamps or the like.

Another object of the invention is to provide a novel high torque, self-locking nut and bolt unit wherein a positive lock is effective between the nut and bolt in all relative angular positions thereof.

Still another object is to provide a self-locking nut and bolt unit wherein locking is effected without thread mutilation and without applying stress to the threads.

Other objects and advantages will appear and be brought out more fully in the following description, considered with the accompanying drawings, wherein:

FIG. 1 is a top or end view of a nut and bolt unit having locking serrations embodying one form of this invention and wherein the nut and bolt have the same number of serrations;

FIG. 1-A is a fragmentary top or end view of a nut and bolt unit similar to FIG. 1, in which the nut and bolt have an unequal number of serrations;

FIG. 2 is a side view in quarter section of the nut shown in FIG. 1;

FIG. 2-A is an enlarged fragmentary sectional view of the nut shown in FIG. 1;

FIG. 3 is a side view of the end of the bolt shown in FIG. 1;

FIG. 3-A is an enlarged fragmentary sectional view of the bolt shown in FIG. 3;

Figure 3:
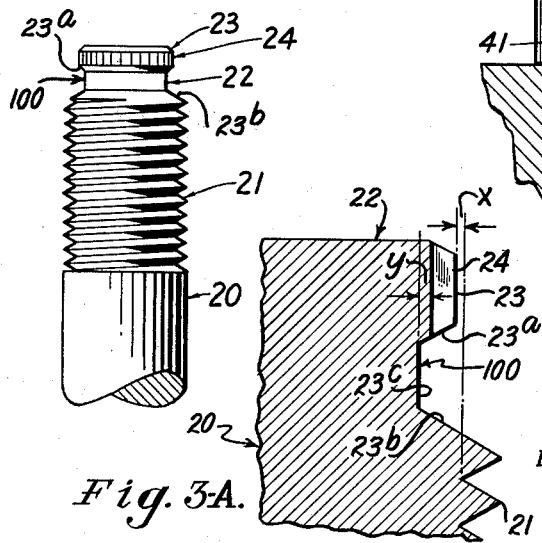

Referring more particularly to the drawings, and especially to the modification of FIGS. 1 to 4, there is shown a bolt or screw 20 having a portion provided with external threads 21 adjoining a reduced upper end portion 22 and a flange 23 spaced from the threaded portion by an annular groove 100. The upper and lower edges of the flange 23 are beveled, as shown, the lower beveled edge 23a, FIG. 3-A, forming a side wall of the annular groove 100. The peripheral edge of the flange 23 is formed with a plurality of longitudinal or axially extending saw-tooth like serrations 24. The groove 100 has a lower tapered side wall 23b merging into the threaded portion 21, as shown in FIGS. 3 and 3-A, and has a bottom wall 23c of less diameter than the root diameter of the serrations 24. The diameter of the crests of the serrations 24 is smaller in diameter than the root diameter of the threads 21, as indicated by the dimension X in FIG. 3-A, and the bottom 23c of the annular groove 100 has a diameter less than the root diameter of the serrations 24, as indicated by the dimension Y, to facilitate the cutting of the threads 21 and the milling or broaching of the serrations 24. A difference in diameters of about .005 to .010 of an inch is adequate in most instances.

A nut 25 has a major portion provided with internal threads 26 adapted to mate with the threads 21, and a generally cylindrical tapered upper end extension 27 terminating in an inturned flange 28 axially spaced from the threads 26 by an unthreaded portion 101. The inturned flange 28 is formed with a plurality of internal saw-tooth like serrations 29. The end extension 27 is provided with a series of circumferentially spaced, axially extending, slots or splits 30, the slots extending through about half the axial height of the internal threads 26, forming a plurality of resilient fingers 31. Each finger 31 has, on its inturned end, a multiplicity of the axially extending serrations 29, which are adapted to matingly engage the serrations 24 on the flange 23. The root diameter of the serrations 29 (FIG. 2-A) is less than the crest diameter of the internal threads 26, to permit the serrations 29 to be broached without damage to the threads. The difference in diameters in represented by the dimension Z, which may be equal to the dimensions X and Y.

Figure 1:
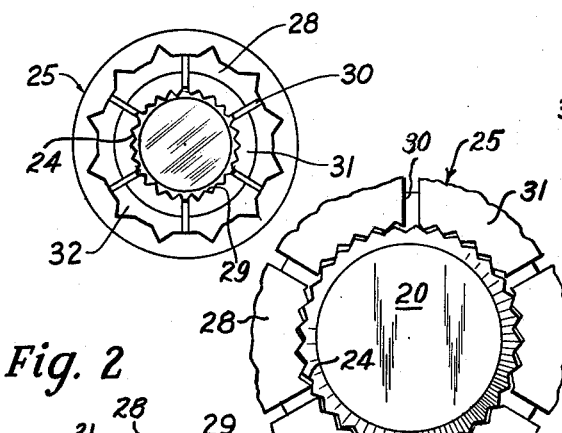

The number of serrations 29 may be the same as the number of serrations 24, as in FIG. 1, to provide a maximum resistance to relative rotation between the bolt 20 and the nut 25. On the other hand, the serrations on the nut may be a few greater or a few less (a few meaning 1 to 3) than on the bolt, whereby only a very few serrations almost fully mesh, and the other serrations are at various relative positions of non-registration. Because of this arrangement, a positive lock is effected with the advantage that it is easier to cause relative rotary movement between the nut and bolt than would be the case if all serrations meshed.

An example of the latter arrangement is shown in FIG. 1-A, in which the flange 23 of a ⅜" dia. bolt has, for example, 32 serrations 24, and the serrations 29 on the nut flange 28 are spaced, for example, to provide for 33 serrations, or one more than on the bolt flange 23. In other words, the angular spacing of the crests of the serrations 24 is 11°15′, and the angular spacing of the crests of the serrations 29 is 10°54.54′, or an angular difference of about 0°20.56′. As shown in FIG. 1-A, the serration designated M on the lower right finger 31 is in full mating relation between two serrations 24 on the bolt flange, and the latter serrations are gripped by the serrations on either side of the serration M. All of the other serrations are out of exact mating relation, but occupy various intermediate positions in which about one-half have components, due to a camming action induced by the resilience of the fingers, tending to hold the nut from rotating in a counter-clockwise direction, and another half have components tending to hold the nut from rotating in the other direction, thereby balancing the rotational components and holding the nut against loosening.

Another advantage of having an unequal number of serrations on the nut 25 and bolt 20 is that, since most of the serrations are out of true mesh, a positive camming action is always effective to prevent relative rotation and vibration regardless of the angular position of the nut relative to the bolt, so that the nut will remain in the exact angular position to which it has been tightened. A further advantage is that, with only a few serrations in approximately full mesh at any one time, the application of only relatively low torque to the nut 25 is required to ratchet the nut serrations 29 over the bolt serrations 24 during either applying or removing the nut.

In contrast therewith, when the same number of serrations, for example 24 (FIG. 1), are provided on both the bolt and nut, the serrations would be in full locking engagement at 24 different positions for each complete revolution of the nut, or once for every 15° of rotation. Moreover, a greater torque would be required to tighten and loosen the nut for the reason that all of the fingers 31 would have to be simultaneously sprung radially outwardly to an extent equal to the radial height of the bolt serrations 24 each time the nut is ratcheted over a bolt serration. This provides a very effective lock, albeit a greater torque is required than when only one or a few serrations are in full mesh.

It is evident that any suitable number of serrations may be used and that a difference greater than one serration may be provided on the bolt and nut. It will also be clear that the serrations on the nut may be greater in number than on the bolt.

The crest diameter formed by the sharp edges of the serrations 29 on the fingers 31 preferably has a diameter, when the fingers are unstressed, which is slightly less than the root diameter of the serrations 24 on the flange 23. Consequently, the fingers 31 are slightly flexed outwardly when the serrations 24 and 29 are in mating relation. The fingers 31, however, are at all times urged toward the flange 23 by their inherent resilience. The nut 25 may be formed with external ribs 32 for engagement by a box wrench or other tool for tightening or loosening.

The nut 25 may be fabricated by any of the methods known in the art. The slots 30 may be made by sawing, after which the fingers 31, or only the upper end portion thereof, may be forced radially inwardly, if desired, to produce a permanent deformation. If the portion of the fingers 31 having the threads 26 is also sprung inwardly, the internal diameter of the threaded upper end of the nut will be less than the diameter of the lower portion, and also less than the diameter of the threaded portion of the bolt 20, to provide an interference fit in addition to the positive lock provided by the serrations.

Figure 4:
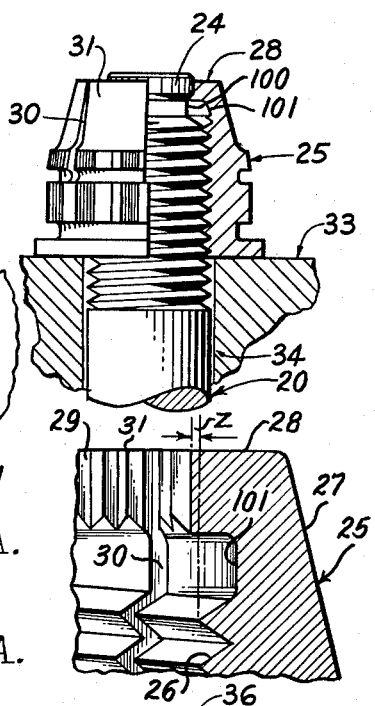
FIG. 4 is a side view, partly in section, showing the nut and bolt of the preceding figures assembled as a unit and associated with a work piece.
Figure 2:
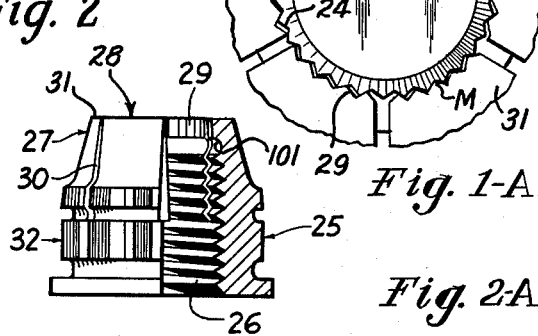

FIG. 4 shows a nut and bolt assembly secured to a workpiece 33 having a hole 34 through which the bolt or screw 20 extends. In the operation of the invention, when a nut 25 is run on the threads 21 and tightened against the workpiece 33, the beveled upper edge on the serrations 24 will engage with the serrations 29 on the resilient fingers 31 and they will ratchet over the serrations 24 until the nut 25 is fully tightened and the nut 25 will then be locked in the set position, the lock setting occurring at a high torque value determined by the design and dimensioning of the serrations 24 and the fingers 31, and by the stressed condition of the fingers 31, as indicated above. The nut 25 can be removed by application of reversed torque. The beveled upper edge of the flange 23 assists, by a camming action, the initial spreading of the fingers 31 to engage the serrations 29 with the serrations 24 on the flange.

In the remote event of unintentional or accidental release of the lock between the serrations 24 and 29 on the flanges 23 and 28, respectively, by an unscrewing action, the flange 23 will enter the unthreaded portion 101 of the internal bore of the nut 25 between the flange 28 and the internal threads 26. The resilience of the spread fingers 31 will urge them inwardly toward each other, which will force the internal threads 26 in the split upper portion of the nut 25 tightly against the external threads 21 on the bolt 20, thereby resisting further unscrewing.

Figure 5:
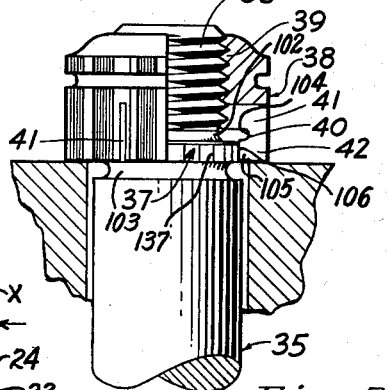
FIG. 5 is a side view, partly in section, of a modified form of the invention in which the nut is slotted and serrated at its inner end to cooperate with locking serrations on the bolt located inwardly of its threads.

In FIG. 5 there is shown a modified form of the invention wherein a bolt or screw 35 has external threads 36 at its outer or upper end and a flange 37 having serrations 137 disposed or displaced a substantial distance axially inwardly from the end of the bolt and from the terminal end of the threads 36, as shown. The space between the threads 36 and the flange 37 is occupied by an unthreaded portion 102 having a bottom wall of less diameter than the root diameter of the serrations 137 in the flange 37. A groove 103, spaced inwardly of the flange 37, has a bottom wall which is also of less diameter than the root diameter of the axially extending serrations 137 in the flange 37. A complementary nut 38 has an internally threaded bore 39 and an end counterbore 40 at its inner or lower end. An internal annular recess 104 is provided in the wall of the counterbore 40 a short distance from the end thereof and adjacent the internally threaded portion, as shown, to form an extension having an inturned flange 105 on the lower or inner end of the nut. This lower end of the nut is provided with a series of circumferentially spaced, axially extending, slots or splits 41 extending about halfway through the nut from its lower side and through a portion of the internal threads in the bore 39, forming a plurality of resilient fingers 42 having a multiplicity of axially extending internal serrations 106 adapted to matingly engage the serrations 137 on the flange 37 of the screw 35. The number of serrations 106 may be the same as the number of serrations 137, or may differ, as described in connection with FIGS. 1 to 4.

As in the modification shown in FIGS. 1-4, the fingers 42 are, preferably, but not necessarily, permanently deformed inwardly so that the internal diameter of the threaded portion of the nut through which the slots 41 extend is less than the diameter of the other portion and also less than the diameter of the threaded portion of the bolt 35. The diameter of the crown of the serrations 106 on the ends of the fingers 42, when the fingers are in their unstressed condition, is slightly less than the root diameter of the serrations 137, whereby the fingers 42 are spread or flexed outwardly when the serrations 137 mate with the serrations 106 on the fingers. This form of the invention is functionally similar to that of FIGS. 1 to 4 in that the serrations 106 on the fingers 42 will ratchet over the serrations 137 on the flange 37 when the nut 38 is rotated and tightened on the screw 35. The upper edge of the flange 37 is beveled to provide a camming action to facilitate the initial spreading of the fingers 42.

The same high torque setting and releasing values will obtain as with the nut and bolt assembly of FIGS. 1 to 4. Likewise, unintentional, or intentional unscrewing of the nut 38 will permit the fingers 42 comprising the inturned flange 105 on the inner end of the nut to flex inwardly toward the unthreaded portion 102 of the bolt 35, whereby the inherent resilience of the fingers will tightly urge the internal threads of bore 39, on that portion of the nut 38 through which the slots 41 extend, into tight engagement with the external threads 36 on the bolt 35, effecting a locking action.

Figure 6:
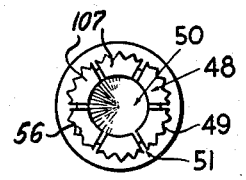
FIG. 6 is an end view of a bolt or screw similar to that of FIG. 1, but modified by providing a bore and slots in the serrated end thereof.
Figure 9:
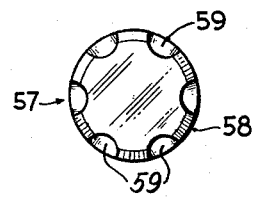
FIGS. 9, 10 and 11 are views similar to FIGS. 6, 7 and 8, respectively, showing another modified form of the invention.
Figure 7:
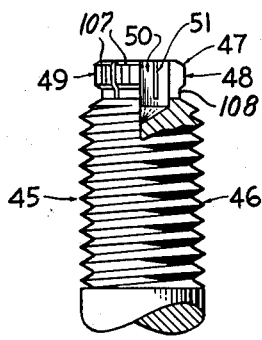
FIG. 7 is a side view, partly in section, of the same.
Figure 8:
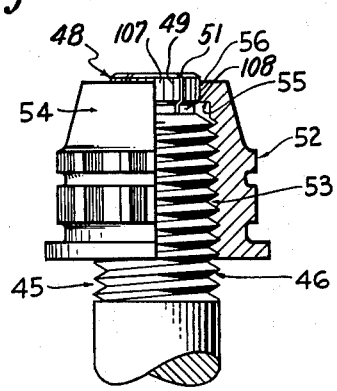
FIG. 8 is a view showing a serrated but unslotted nut in quarter section assembled with the bolt of FIGS. 6 and 7.

In FIGS. 6 to 8, there is shown another form of the invention. These figures show a bolt or screw 45 having external threads 46 over a portion thereof, and a reduced diameter end portion 47 having a flange 48 provided with longitudinal or axially extending serrations 49. The upper and lower edges of the flange 48, adjacent the periphery thereof, are beveled to permit the flanged portion of a nut 52, FIG. 8, to ride thereover, as in FIG. 3-A. The screw 45 is formed with an end bore 50 providing an annular extension having a series of circumferentially spaced, axially extending, slots or splits 51 extending inwardly to the threads 46 and forming a plurality of resilient fingers 107.

The nut 52, FIG. 8, has internal threads 53 extending over a major portion thereof adapted to mate with the external threads 46 on the bolt 45, and a tapered outer end portion 54 formed with an inturned flange 55, having axially extending serrations 56, which are adapted to engage the serrations 49 on the flange 48. As, in the previously described modifications, the number and design of serrations 49 and 56 may be the same, or each flange 55 and 48 may have a different number. An annular groove 108 is provided between the end flange 48 and the threads 46 on the bolt 45, which has a bottom wall of less diameter than the root diameter of the serrations 49. The slots 51 extend across this annular groove, as clearly shown in FIGS. 7 and 8. The diameter of the crown of the serrations 49, when the fingers 107 of the flange 48 are in their unstressed condition, is preferably, but not necessarily, greater than the root diameter of the serrations 56. The threaded bore of the nut 52 has a greater diameter than the crown diameter of the serrations 49 when unstressed, to permit passage of the threaded portion of the nut 52 over the flange 48. In this form of the invention, when a nut 52 is run or set in position on the bolt 45, the serrations 49 on the resilient fingers 107 at the end of the bolt will ratchet in engagement with the serrations 56 within the flange 55, and the nut will be locked in set position with the same high torque conditions as with the other forms of the invention, the fingers 107 being flexed inwardly by the continuous flange 55.

Figure 10:
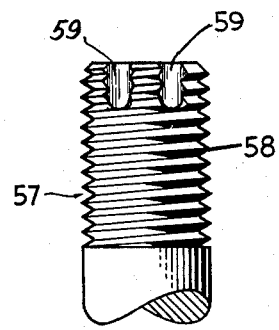

In FIGS. 9 to 12 there is shown another form of the invention wherein a bolt or screw 57 has external threads 58 on one end thereof, and a plurality of circumferentially spaced, longitudinal grooves 59 cut across the threads 58 adjacent the end of the screw. As shown in FIG. 10, these grooves are slightly deeper than the thread root. A generally cylindrical nut 60, substantially similar to the nut 25, has a tapered end 61, and an inturned flange 62. The upper end of the nut is provided with a series of circumferentially spaced, axially extending splits or slots 63, the slots extending through about half of the internal threads, as shown, forming resilient fingers 64. Each finger 64 has a rounded protuberance 64a, FIG. 12, adapted to engage in one of the grooves 59 of the screw 57. The diametrical distance between tips of the protuberances 64a on the fingers 64, in their unstressed condition, is less than the diametrical distance between the bottoms of the grooves 59, whereby the fingers are stressed outwardly when their protuberances are in mating relation with the grooved portions of the threads.

Figure 11:
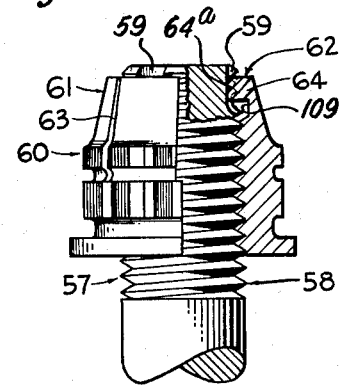
Figure 12:
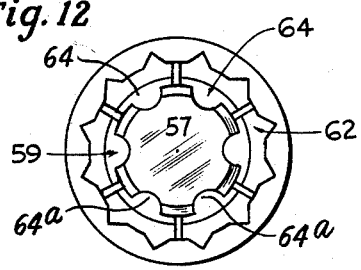
FIG. 12 is a top or end view of the assembly shown in FIG. 11.

As in the previously described forms of the invention, the fingers 64 are preferably given an inward deformation after the slots 63 are cut, whereby the diameter of the threads in the slotted portion is slightly less than the diameter of the threads in the other portion. In this form of the invention, the grooves 59 function similarly to the serrations 24 of the screw 20 of FIGS. 3 and 4 and, when the nut 60 is run on and set, the protuberances 64a on the fingers 64 engage the grooves 59 with a radially inward pressure forming a positive holding and locking engagement. The upper edge of the bolt 57 is beveled to facilitate initial spreading of the fingers 64. A groove 109 is formed in the slotted portion of the nut, between the upper portion of the fingers 64 and the lower threaded portion of the nut, as shown in FIG. 11. As in the previously described structures, in the remote case of unintentional unscrewing of the nut, producing movement of the protuberances 64a of the fingers 64 off of the threaded and grooved end of the bolt, the inherent resilience of the fingers will force the internal threads in the split upper portion of the nut tightly against the upper threaded and grooved portion of the bolt 57, forming a thread locking engagement which prevents further unscrewing.

Figure 13:
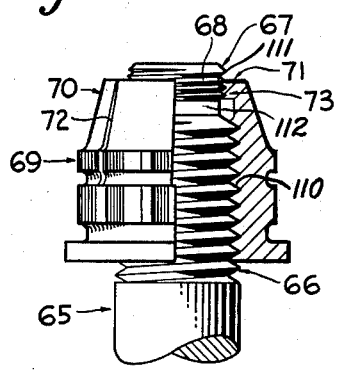
FIGS. 13 to 16 are views similar to FIG. 11, respectively, showing further modified forms of the invention.

In FIG. 13 there is shown another form of the invention wherein a bolt or screw 65 has threads 66 and an end 67 of reduced diameter having threads 68 of a pitch differing from the pitch of threads 66. A generally cylindrical nut 69 has a tapered end 70 provided with an inturned flange 71, and a series of spaced, axially extending, splits or slots 72, the slots extending to a point about halfway through the internal threads 110, forming resilient fingers 73. The inner ends of the fingers 73 have threads 111 adapted to mate with the threads 68. After the threads 110 and 111 are formed in the nut 69, the slots 72 may be cut to form the fingers 73. The fingers may then be permanently deformed inwardly, if desired. The crest diameter of the threads 111 on the fingers 73, when the fingers are in their unstressed condition, is slightly less than the root diameter of the threads 68, whereby the fingers are spread and stressed outwardly when the threads 111 engage the threads 68, as shown. The upper edge of the bolt 65 is beveled to facilitate such spreading. The space between the bolt threads 68 and the threads 66 is provided with a groove 112, having a bottom wall of less diameter than the root diameter of the threads 68. The diameter of the bore in the nut 69 is greater than the diameter of the crown of the threads 68. When the nut 69 is run and tightened on screw 65, the threads 111 on the fingers 73 will ratchet axially over threads 68, because of the different pitch with reference to the threads 66 and 110, and lock the nut with high torque values, as with the previously described forms of the invention. As in the structure of FIGS. 1 to 4, unscrewing of the nut so that the ends of the fingers ride off the threaded end 67 will permit the inherent resilience of the fingers to force them inwardly toward each other, which will urge the internal threads 110 in the outer split portion of the nut 69 to tightly engage the threads 66, thereby locking against further unintentional unscrewing.

Figure 14:
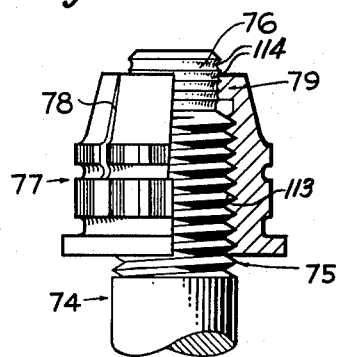

In FIG. 14 there is shown another form of the invention in which a bolt or screw 74 has threads 75 and a reduced diameter end portion formed with separated grooves 76, which are continuous circumferentially and of uniform size and shape. A nut 77 is provided with a series of circumferentially spaced, axially extending, splits or slots 78, the slots extending through about half of the internal threads 113, forming resilient fingers 79 having circumferentially extending ribs 114 adapted to mate with the grooves 76. When the nut 77 is run and tightened on the bolt 74, the ribs 114 axially ratchet over grooves 76 and lock the nut with the high torque values as in the other forms of the invention. Also, as in the previous modifications, the fingers 79 may be permanently deformed inwardly, if desired. The diameter of the outer edges of the ribs 114 on the fingers 79, when in their unstressed state, is, therefore, slightly less than the diameter of the grooves 76, whereby the fingers 79 are spread and stressed outwardly when the ribs 114 engage the grooves 76 in the position shown in FIG. 14. The upper edge of the bolt 74 is beveled to facilitate such spreading.

In the remote event of inadvertent unscrewing of the nut 77 to a position in which the ribs 114 on the fingers 79 run off the grooves 76, the inherent resilience of the fingers will urge them inwardly toward each other, thereby forcing the internal threads 113 in the upper, split, portion of the nut 77 tightly against the external threads 75 on the bolt 74, providing a locking action which would prevent further unscrewing of the nut.

Figure 15:
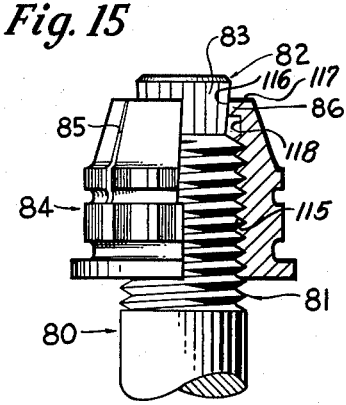

In FIG. 15 there is shown another form of the invention wherein a bolt or screw 80 has threads 81 and a reduced upper end portion 82 which is flared outwardly in a direction away from the threaded portion. The flared portion 82 has axially extending serrations 83 thereon. A nut 84 having mating threads 115 is provided with a series of circumferentially spaced, axially extending splits or slots 85, the slots extending through about half of the internal threads 115, forming inturned resilient fingers 86 having serrations 116 which matingly engage the serrations 83. The fingers 86 terminate in inwardly directed flanges 117, which are spaced from the internal threads on the bolt 80 by an unthreaded portion 118 in the nut 84. The serrations 116 are formed on the inner edges of the flanges 117. The bottom wall of the unthreaded portion 118 has a greater diameter than the maximum diameter of the root of serrations 83. After the threads 115 and serrations 116 are formed in the nut 84 and the slots 85 are cut, the fingers 86 may be given a permanent inward deformation. The crest diameter of the serrations 116 on the end of the fingers 86, when the fingers are in their unstressed state, is less than the least diameter of the root of the serrations 83, whereby the fingers 86 will be stressed in any mating position of the serrations 116 with the serrations 83 on the flared upper portion 82 of the bolt 80.

When the nut 84 is run and tightened on the screw 80 and locked by engagement of the serrations 83 and 116, the fingers 86 will be spread outwardly, and the nut will be held with the same high torque values as with the other forms of the invention. The upper edge of the flared end 82 is beveled to facilitate the initial spreading. The flare of end 82 is such that a back-off torque higher than the setting torque obtains. In the remote event of inadvertent unscrewing to a position in which the serrations 116 on the fingers 86 ride off the serrated end portion 82, the upper end of the portion 82 will register with the unthreaded portion 118 in the upper end of the nut 84, permitting the fingers to be flexed inwardly, forcing the internal threads 115 in the split portion of the nut 84 tightly against the threads 81, forming a locking action which prevents further unscrewing.

Figure 16:
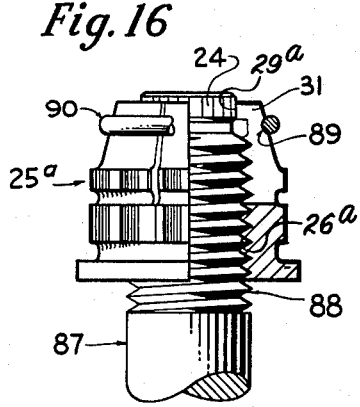

In FIG. 16 there is shown another form of the invention wherein the bolt or screw 87 has threads 88, and a nut 25a, substantially similar to nut 25 of FIGS. 1 to 4, and has mating threads 26a. Nut 25a has a circumferential groove 89 formed in the fingers 31 adjacent the free end thereof, and a resilient, split lock ring 90 is positioned in this groove and serves to provide additional force to hold the serrations 29a on the fingers 31 of the nut in engagement with the serrations 24 of the screw.

Figure 18:
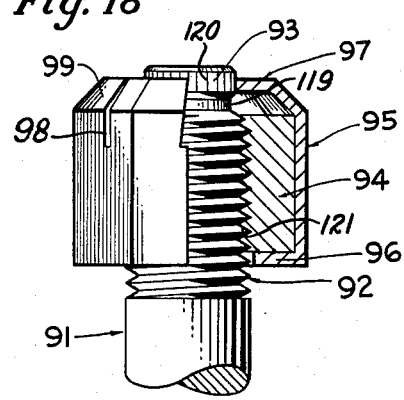
FIG. 18 is a side view, partly in section, of the parts shown in FIG. 17.
Figure 17:
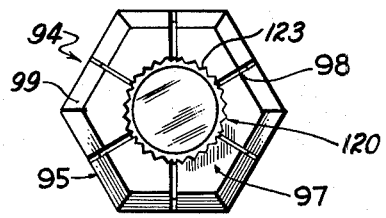
FIG. 17 is a view similar to FIG. 12, showing another modified form of the invention in which a conventional hex nut is enclosed in a shell having serrated resilient fingers engaged with serrations at the outer end of a bolt.

In FIGS. 17 and 18 there is shown another form of the invention wherein a bolt or screw 91 has threads 92 and an upper, reduced, serrated end flange 93 similar to that on the bolt or screw 20 of FIGS. 3 and 4. A recess 119 is provided between the serrated end flange 93 and the threads 92, the bottom wall of the flange 93 having a diameter which is less than the root diameter of the serrations 120 in the flange 93. A conventional nut 94 has internal threads 121 adapted to matingly engage the threads 92. A shell 95 encloses the nut 94 and has an inturned flange 96 at its lower end and an inturned flange 97 at its upper end. The upper portion of the shell 95, and the flange 97, are provided with a series of spaced, axially extending, slots or splits 98, forming resilient fingers 99 which are provided with serrations 123 which make ratcheting engagement with the serrations 120 in end flange 93 of the bolt or screw 91 when the nut is run and tightened on the bolt or screw. The recess 119 has an axial width which is greater than the axial width of the inturned flange 97. The crown diameter of the serrations 123 on the end of the fingers 99, when the fingers are in their unstressed state, is less than the root diameter of the serrations 120 on the flange end 93, whereby the fingers are stressed outwardly when the serrations 123 matingly engage the serrations 120 on the end flange 93, as shown in FIGS. 17 and 18. The upper edge of the flange 93 is beveled to facilitate spreading of the fingers 99.

All of the nut and bolt units disclosed herein are designed so that when used as intended, there will be no overscrewing of the nut that would carry the serrations or other locking elements thereon, inwardly beyond a point where they would be unable to engage with the corresponding locking elements on the bolt.

It will be understood that various changes may be made in the details of construction and in the arrangement of parts of the bolt and nut units disclosed herein without departing from the principles of the invention and the scope of the annexed claims.

I claim:

1. A nut and bolt unit, comprising: a bolt member having an externally threaded portion and an adjacent flange portion having adjacent, axial, saw-tooth like locking serrations thereon extending throughout its entire outer periphery, the diameter of the locking serrations being different from the diameter of the threaded portion, said flange being separated from the threaded portion by a circumferential groove; a nut member having threads in an interior portion thereof that mate with the threads on the bolt member, said nut member including an extension having an inwardly extending flange at one extremity with saw-tooth like locking serrations thereon extending throughout its entire inner periphery and adapted to engage the locking serrations on the bolt flange; one of said members having circumferentially spaced, axially directed slots extending from one end thereof to provide resilient fingers, said slots being spaced to include a multiplicity of said axial serrations therebetween, whereby each of said fingers carries a multiplicity of locking serrations on the inwardly extending flange portion there, said locking serrations on the fingers, in the unflexed condition of said fingers, forming a ring having a smaller diameter than the diameter of the locking serrations on said bolt member, whereby the fingers are spread when said locking serrations are interengaged.

2. A nut and bolt unit as recited in claim 1, in which the slots are provided in the bolt member and extend through the flange thereon.

3. A nut and bolt unit as recited in claim 1, in which the slots are provided in the portion of the nut member other than that portion having the mating threads.

4. A nut and bolt unit as recited in claim 1, in which the angular spacing of adjacent serrations on one member is slightly less than the angular spacing of adjacent serrations on the other member, and wherein said angular spacings and the resulting numbers of serrations are such that said one member has one to three more serrations than said other member, whereby only a very few serrations on both members almost fully mesh, so that the force required to rotate the nut member is less than if all serrations meshed.

5. A nut and bolt unit as recited in claim 1, in which the slots are provided in the nut member and extend through the serrated inwardly extending flange and into the portion of the nut having the internal mating thread.

6. A nut and bolt unit as recited in claim 1, in which the flange on the bolt member is at the outer end of said bolt member, and wherein the bolt member has an end bore extending inwardly beyond said flange and wherein the slots are provided in the bolt member and extend through said flange and intersect said bore.

7. A nut and bolt unit as recited in claim 1, wherein the nut member has a circumferential groove formed in the exterior of the resilient fingers, and a resilient, split lock ring is positioned in the groove and provides additional force to hold the serrations on said fingers engaged with the serrations on the bolt member.

8. A nut and bolt unit, comprising: a bolt member having an externally threaded portion and a generally cylindrical outwardly extending flange axially spaced from said threaded portion, said flange having axially extending saw-tooth like serrations disposed about its entire periphery, said bolt member having a groove disposed axially inwardly of said flange having a bottom wall of less diameter than the root diameter of said flange serrations, and a nut member having internal threads mating with said external threads on said bolt member, said nut member having a generally cylindrical axial extension at one end thereof provided at its extremity with an inwardly extending flange, said inwardly extending flange having axially extending saw-tooth like serrations disposed about its entire inner periphery, said extension being provided with a series of circumferentially spaced, axially extending slots intersecting with said internal threads and forming a plurality of resilient fingers, said slots being spaced to include a multiplicity of said axial serrations therebetween, whereby each of said fingers has a multiplicity of axial serrations on the inwardly extending flange portion thereof adapted to engage with the serrations on said bolt flange to lock said nut member and bolt member against unintentional relative rotation, said groove in said bolt member permitting said nut member to assume a position relative thereto in which the serrations on the fingers of said nut member may be disposed slightly axially inwardly of the serrations on the flange on said bolt.

9. A nut and bolt unit as recited in claim 8, in which the axially serrated, outwardly extending flange is on the outer end of the bolt member.

References Cited in the file of this patent

UNITED STATES PATENTS

| | | |
|---|---|---|
| 573,397 | De Graffenvied | Dec. 15, 1896 |
| 629,530 | Skelly | July 25, 1899 |
| 647,962 | Hall | Apr. 24, 1900 |
| 864,478 | Miller | Aug. 27, 1907 |
| 891,990 | Henry | June 30, 1908 |
| 1,010,264 | Jacques | Nov. 28, 1911 |
| 1,085,041 | Haughey | Jan. 20, 1914 |
| 1,106,273 | Backus | Aug. 4, 1914 |
| 1,931,900 | McQuaid | Oct. 24, 1933 |
| 2,082,228 | Stoll | June 1, 1937 |
| 2,106,669 | Thornton | Jan. 25, 1938 |
| 2,380,240 | Hufferd | July 10, 1945 |
| 2,398,827 | Graham et al. | Apr. 23, 1946 |
| 2,423,918 | Wohlhieter | July 15, 1947 |
| 2,521,257 | Sample | Sept. 5, 1950 |
| 2,834,390 | Stevens | May 13, 1958 |

FOREIGN PATENTS

| | | |
|---|---|---|
| 696,434 | France | Oct. 14, 1930 |
| 424,324 | Germany | Jan. 26, 1926 |
| 552,263 | Great Britain | Mar. 30, 1943 |
| 678,199 | Great Britain | Aug. 27, 1952 |